Aug. 23, 1949.　　　R. H. WARBURTON　　　2,479,654
TWO-SPEED TRANSMISSION FOR BICYCLES
Filed Sept. 6, 1945　　　　　　　　　3 Sheets-Sheet 3
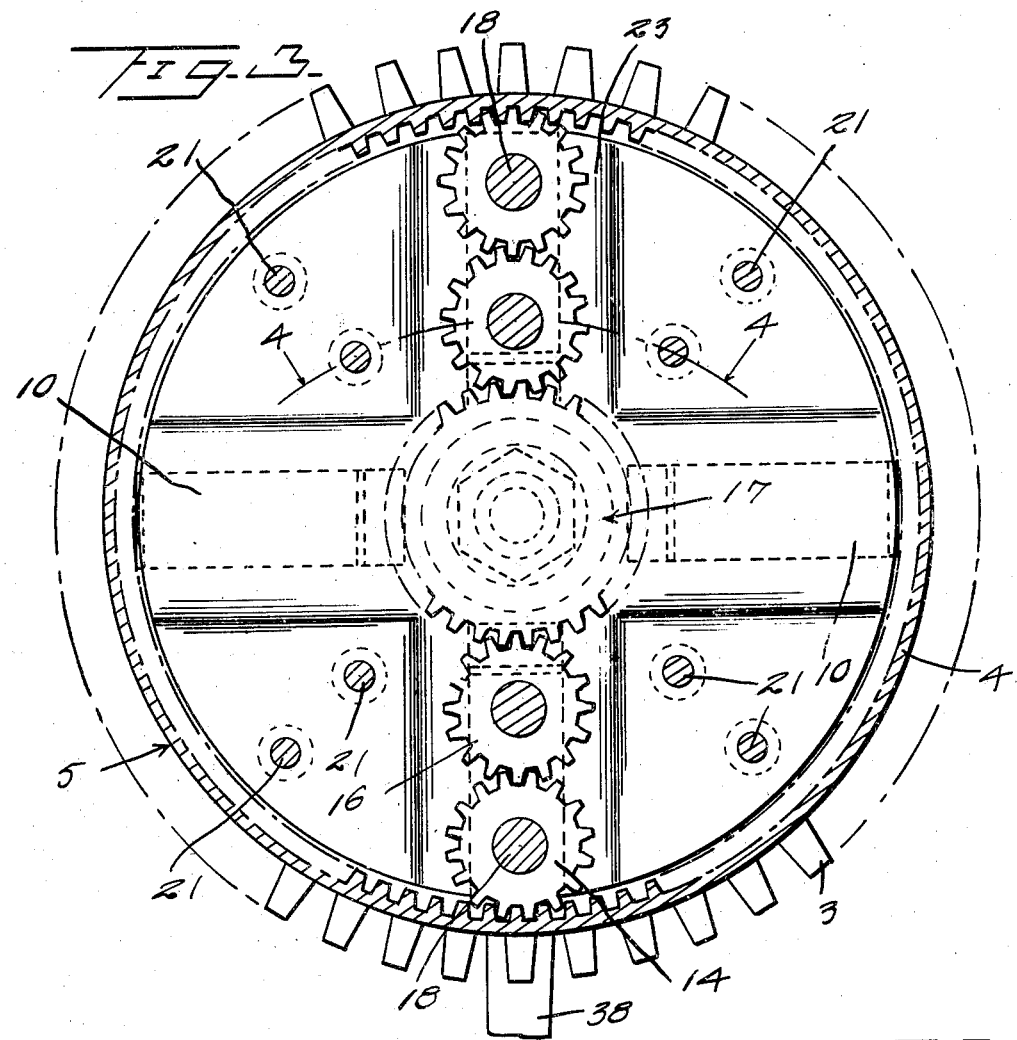
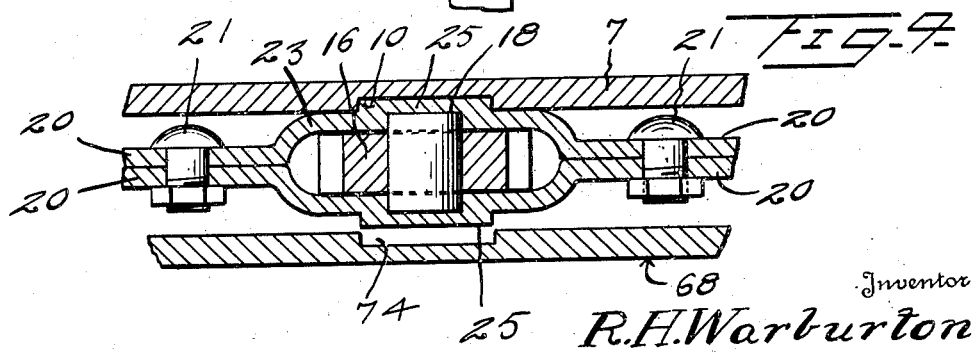
Inventor
R. H. Warburton
By Randolph & Beavers
Attorneys Patented Aug. 23, 1949

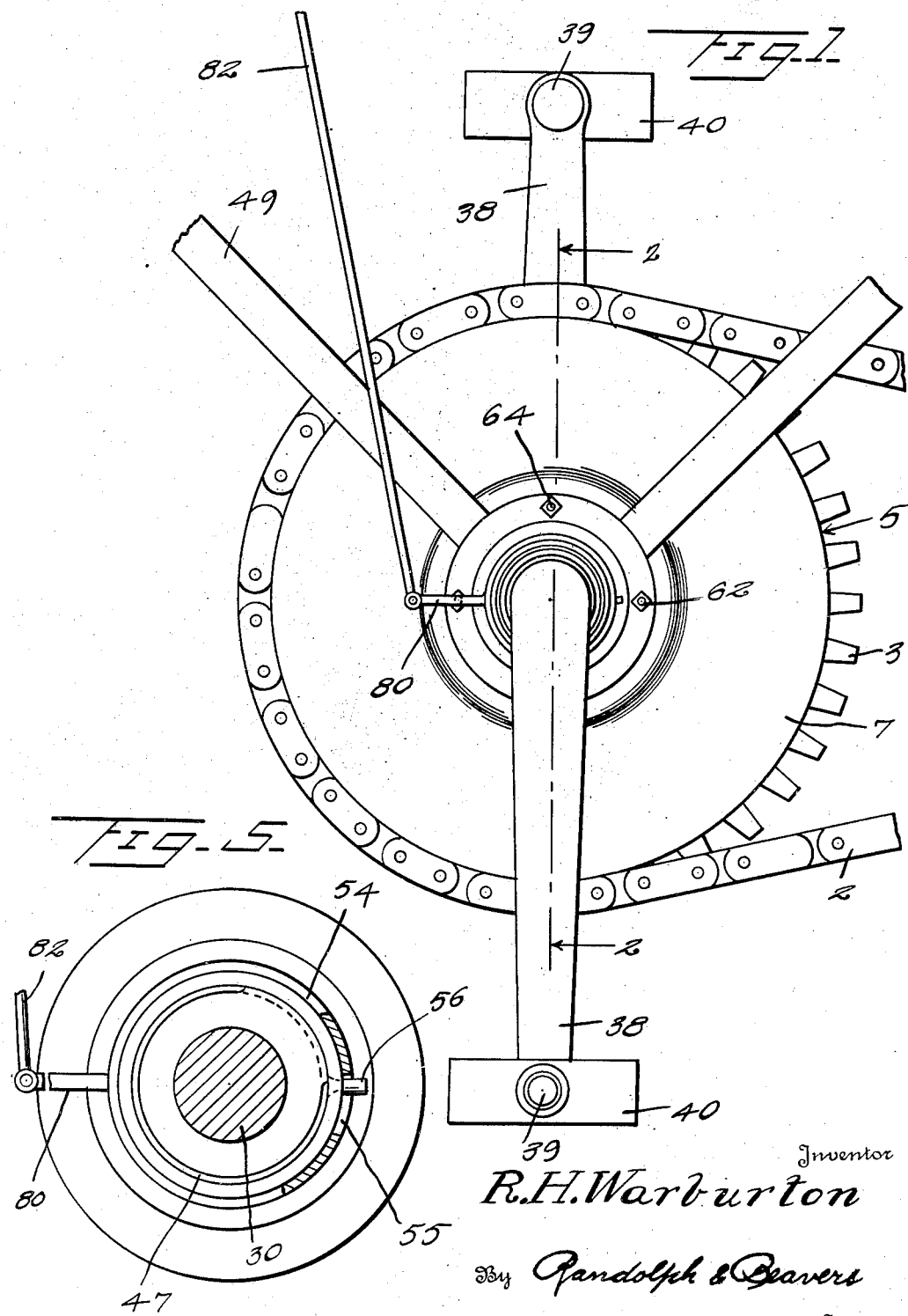

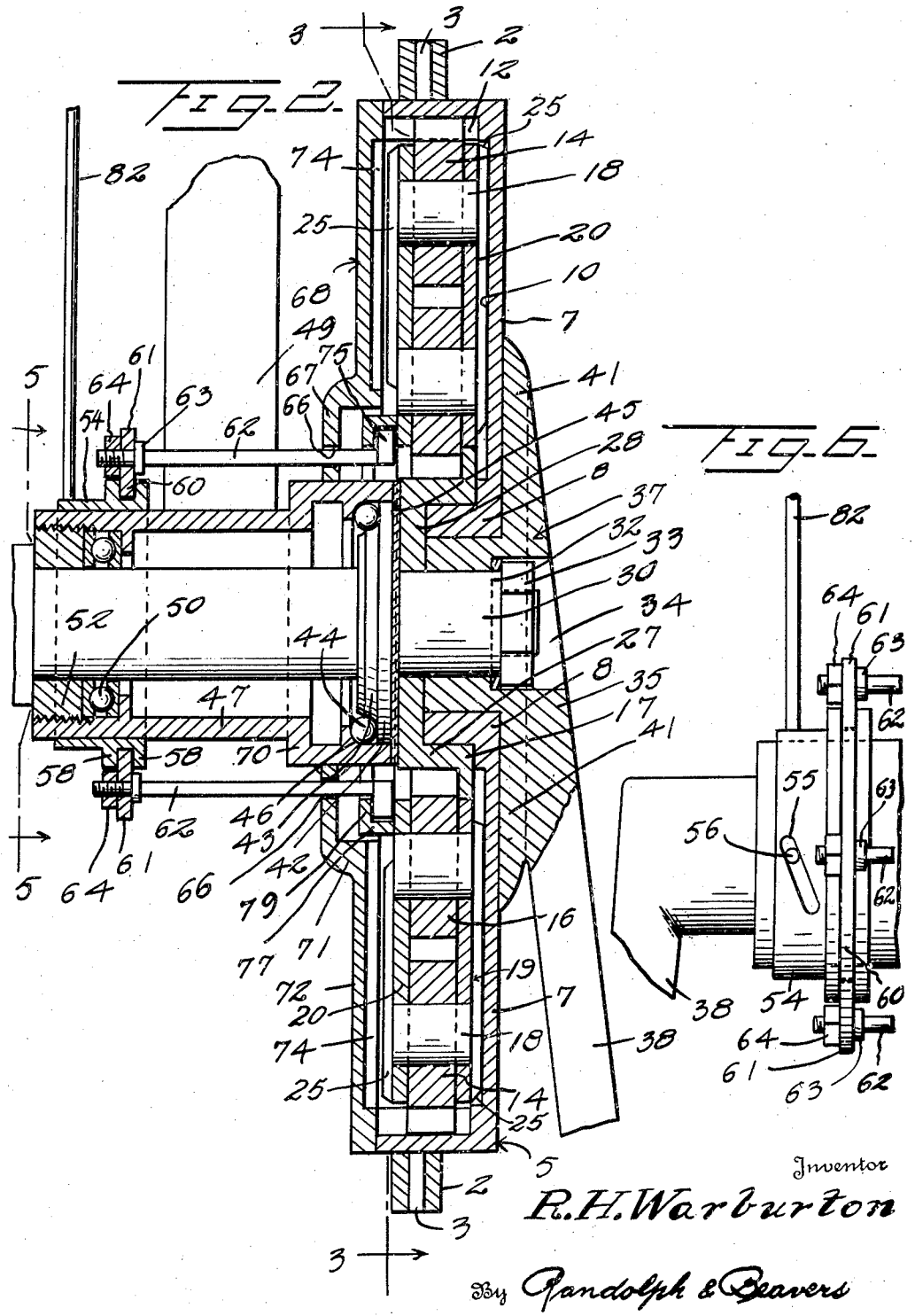

2,479,654

UNITED STATES PATENT OFFICE 2,479,654

TWO-SPEED TRANSMISSION FOR BICYCLES

Robert H. Warburton, Flint, Mich.

Application September 6, 1945, Serial No. 614,672

8 Claims. (Cl. 74—789)

This present invention relates to propulsion gearing for bicycles, but the gearing is not limited to that field of application.

The primary object of the invention is the provision of a planetary gear assembly in which the sun gear can drive the internal gear at a reduced speed or can be locked to certain other gears of the assembly.

Another object of the invention is the application of such gear assembly to the propelling means of a bicycle.

Still another object of the invention is the provision of control means within reach of the driver for either locking the sun gear to the internal gear of the planetary gear assembly or for permitting the former to drive the latter at a reduced speed.

With these and other objects in view the invention consists in certain novel features of construction and combinations of parts which will be hereinafter described and pointed out in the claims.

For a further understanding of the invention reference is to be had to the accompanying drawings illustrating the description and in which:

Figure 1 is a side view of the propelling portion of a bicycle incorporating a preferred embodiment of my invention;

Figure 2 is an enlarged diametral section on line 2—2 of Fig. 1;

Figure 3 is a reduced section on line 3—3 of Fig. 2;

Figure 4 is an enlarged arcuate detail section on line 4—4 of Fig. 3;

Figure 5 is a detail section on line 5—5 of Fig. 2;

Figure 6 is a detail view at right angles to Fig. 5.

In the drawings in which like characters of reference designate like or similar parts throughout the several views, numeral 2 Fig. 1 denotes a sprocket chain which drives a sprocket gear (not shown) splined upon the rear wheel shaft of a bicycle and is driven by the teeth 3. The same are formed upon and extend radially from the outer surface of a hollow cylindrical rim 4 of a sprocket wheel generally indicated by 5 and also including a flat annular disc portion 7 which is connected at its outer periphery with the right-hand Fig. 2 edge of the rim and carries at its inner periphery a bearing flange 8 extending towards the left and in parallelism to the rim. Upon the left-hand or inner side of the disc portion are formed four radial grooves 10 performing a function which will become clear as the description proceeds. The inner ends of the grooves stop short of the bearing flange and the outer ends stop short of the rim Fig. 3. Upon the inner side of the rim 4 are formed radial teeth 12 which mesh with the pair of outer planetary gears 14 disposed in opposite diametral relation to one another. Either of these outer gears mesh with an inner planetary gear 16 disposed in a similar relation and both gears 16 mesh with a central or sun gear 17.

The planetary gears are each journaled by means of a shaft 18 in a frame generally indicated by 19 and comprising a pair of annular plates 20 which are substantially duplicates of one another and are attached to one another by four pairs of screw bolts 21 along two diametral lines crossing each other at right angles Fig. 3, 4. The portions 23 of the plates along a pair of diametral zones intersecting with each other at right angles are outwardly deformed and define between themselves diametral intersecting spaces one of which receives the two pairs of planetary gears. Upon the middle part of each bulging portion is formed a pair of ribs 25. The ribs 25 on the outer side of the right-hand Fig. 3 plate fits each into one of the grooves 10 formed on the inner side of the flat plate of the sprocket gear.

The central or sun gear with which the inner pair of planetary gears mesh, consists of a cylindrical portion 27 carrying the gear teeth on its outer side and journaled by its inner or concave surface upon the cylindrical bearing flange 8 of the sprocket wheel. The sun gear also includes a flat annular flange 28 extending inwardly from the inner end of the cylindrical flange and which is fixed to the pedal shaft 30.

The same carries upon its outer right-hand end a washer 32 and nut 33 the former of which bears against the bottom of a socket 34 formed in the hub portion 35 of a pedal crank 37. The same carries at the outer end of its arm 38 a pivot pin 39 extending outwardly and at right angles to its arm 38 and functioning as a pivot for the pedal 40 engaged by the foot of the rider. A similar pedal crank spaced from the pedal described 180° is secured to the left-hand end of the pedal shaft in a similar manner. The hub portions of the pedal cranks are secured upon opposite ends of the pedal shaft and carry each a bearing flange 41 contacting the outer surface of the flat plate portion 7 of the sprocket wheel.

The pedal shaft carries intermediate its ends a radial flange 42 having on one side a groove 43 for balls 44 also bearing against a groove 46 formed on the inner side of a bearing hub 47. Between the radial flange 42 and the adjacent flat annular flange 28 of the sprocket wheel is a bearing disc 45.

The bearing hub 47 is rigid with the frame portion 49 and houses a second ball bearing 50 held against axial movement by a nut member 52 surrounding the pedal shaft and threaded into the left-hand end of the hollow hub 47.

A sleeve 54 surrounds the left-hand Fig. 2 portion of the hub for limited rotation and axial motion and is provided with a slot 55 which forms an acute angle with a diametral plane of the sleeve. A pin 56 extends radially from the outer surface of the hub 47 and through the slot. The sleeve carries on its outer side at and near its right-hand (Figs. 2 and 6) end a pair of spaced flanges 58 engaging opposite sides of a ring 60 which is provided with four uniformly spaced apertured ears 61 extending from the outer narrow edge of the ring.

Through each aperture of an ear extends a rod 62 having adjacent its threaded outer end portion a radial flange 63 bearing against the right-hand side of the ring and a nut 64 upon its threaded portion and bearing against the outer or left side of the ear Fig. 2.

The intermediate portions of the rods extend each through an opening 66 formed in the central flat portion 67 of a disc-like plate 68. The central portion 67 is secured by welding or otherwise upon an enlarged portion 70 of the frame hub 47 and has an inwardly extending cylindrical part 71 integral with a flat annular portion 72 which extends parallel to the flat plate portion of the sprocket gear. Upon the inner side of the plate portion 72 are formed four uniformly spaced radial grooves 74, each adapted for receiving a rib 25, formed upon the left-hand plate of the frame in which the planet gears are journaled.

The innermost end of each rod 62 is formed into an outwardly extending lug 75 which fits into a groove formed by a cylindrical wall 77 extending from the outer side of the left-hand plate of the planet gear frame and a flat flange 79 extending parallel to that plate.

The slotted sleeve 54 has a radial extension 80 which is pivoted at its outer end to a control rod 82 the axial movement of which turns the sleeve and moves it axially owing to the cooperation of the slot and pin.

Figure 6 shows the control rod in a raised position and the slotted control sleeve 54 to which the rod is pivoted Fig. 5, in an extreme position nearest the sprocket wheel. The grooves 10 in the inner side of the flat plate portion 7 of the sprocket are each occupied by one of the right-hand ribs 25 of the frame for the planet wheels. This frame is therefore locked to the sprocket wheel and the planet gears cannot roll over the interior teeth 12 of the sprocket nor over the driving sun gear 17. The frame and the sprocket rotate therefore with the same angular speed. The mechanism is said to be in "high gear."

If the control rod 82 is moved axially downward, the sleeve 54 pivoted thereto is rotated counterclockwise for a viewer viewing Fig. 6 from the left and axially shifted towards the left with the result that the frame 20 with the planet gears is also shifted from the position of Fig. 2 to one in which the ribs 25 on the left-hand side of the planet gear frame 19 occupy the grooves 74 in the plate 68. The sun gear 17 then rotates the sprocket gear 17 by the planet gears at a speed less than its own. The speed ratio between the sun gear 27 and sprocket wheel 5 is equal to the reciprocal of the ratio between the number of teeth of the two gears. Since the number of interior teeth of the sprocket is greater than the number of teeth of the sun gear, the former rotates at a lesser speed than the latter. The mechanism is then said to be in "low gear."

While the foregoing description sets forth the preferred embodiment of my invention in specific terms illustrated by the accompanying drawing, it is to be understood that numerous changes or modifications in the shape, size and materials may be resorted to without departing from the spirit and scope of the invention as claimed hereinafter.

What I claim and desire to protect by Letters Patent is:

1. A gear mechanism comprising, a main frame including a plurality of radial grooves, a sun gear journaled in the main frame, planet gears coacting with the sun gear, a second frame for journaling the planet gears and having a plurality of radial ribs on either side, each rib on one side adapted to be received in one of the grooves, an internal gear coacting with the planet gears and having a plurality of grooves each adapted to receive a rib on the other side of the planet gear frame, and means for shifting the planet gear frame from one position to the other.

2. A gear mechanism comprising, a main frame including a plurality of radial grooves, a sun gear journaled in the main frame, planet gears coacting with the sun gear, a second frame for journaling the planet gears and having a plurality of radial ribs on either side, each rib on one side adapted to be received in one of the grooves, an internal gear coacting with the planet gears and having a plurality of grooves each adapted to receive a rib on the other side of the planet gear frame, shifter rods for shifting the planet gear frame, and rotary means on the main frame for moving the shifter rods axially.

3. A gear mechanism comprising, a main frame including a plurality of radial grooves, a sun gear journaled in the main frame, planet gears coacting with the sun gear, a second frame for journaling the planet gears and having a plurality of radial ribs on either side, each rib on one side adapted to be received in one of the grooves, an internal gear coacting with the planet gears and having a plurality of grooves each adapted to receive a rib on the other side of the planet gear frame, shifter rods connected at one end to the planet gear frame for shifting it between the grooved portions of the main frame and internal gear, and manually actuated means on the main frame for actuating the shifter rods.

4. A gear mechanism comprising, a main frame including a plurality of radial grooves, a sun gear journaled in the main frame, planet gears coacting with the sun gear, a second frame for journaling the planet gears and having a plurality of radial ribs on either side, each rib on one side adapted to be received in one of the grooves, an internal gear coacting with the planet gears and having a plurality of grooves each adapted to receive a rib on the other side of the planet gear frame, a plurality of parallel rods for engaging the planet gear frame with one end and connected by a ring at the other end, a sleeve rotatable on the main frame for moving the ring and rods axially without rotation and having an oblique slot, a pin extending from the main frame into the slot, and a control rod within reach of the rider for turning the sleeve.

5. A gear mechanism comprising, a main frame including a plurality of radial grooves, a sun gear journaled in the main frame, planet gears coacting with the sun gear, a second frame for journaling the planet gears and having a plurality of radial ribs on either side, each rib on one side adapted to be received in one of the grooves, an internal gear coacting with the planet gears and having a plurality of grooves each adapted to receive a rib on the other side of the planet gear frame, a plurality of parallel rods guided in the main frame for engaging the planet gear frame with one end and connected by a ring at the other end, a sleeve rotatable on the main frame for moving the ring and rods axially with rotation and having an oblique slot, a pin extending from the main frame into the slot, and a control rod within reach of the rider for turning the sleeve.

6. In a bicycle, a main sprocket wheel having internal teeth and including a flat flange with a plurality of radial grooves on its inner side, a pedal shaft providing a journal for the sprocket, a main frame providing a journal for the pedal shaft, and including a plate having radial grooves on its inner side, a sun gear rotatable relatively to the sprocket wheel and splined to the pedal shaft, planet gears driven by the sun gear, a frame providing journals for the planet gears and having on either side a plurality of radial ribs each for coaction with a groove in the flange of the sprocket or plate on the main frame, and means within the reach of the rider for moving the planet gear frame laterally of the sprocket wheel and main frame plate.

7. In a bicycle, a main sprocket wheel having internal teeth and including a flat flange with a plurality of radial grooves on its inner side, a pedal shaft providing a journal for the sprocket, a main frame providing a journal for the pedal shaft, and including a plate having radial grooves on its inner side, a sun gear rotatable relatively to the sprocket wheel and splined to the pedal shaft, planet gears driven by the sun gear, a frame providing journals for the planet gears and having on either side a plurality of radial ribs each for coaction with a groove in the flange of the sprocket or plate on the main frame, and rotary means within reach of the driver for moving the planet gear frame laterally of the sprocket wheel and main frame plate.

8. In a bicycle, a main sprocket wheel having internal teeth and including a flat flange with a plurality of radial grooves on its inner side, a pedal shaft providing a journal for the sprocket, a main frame providing a journal for the pedal shaft, and including a plate having radial grooves on its inner side, a sun gear journaled on the sprocket and splined to the pedal shaft, planet gears driven by the sun gear, a frame providing journals for the planet gears and having on either side a plurality of radial ribs each for coaction with a groove in the flange of the sprocket or plate on the main frame, shifter rods connected at one end to the planet gear frame for moving it between said grooved portions, and rotary means axially guided on the main frame engaging the connection of the shifter rods.

ROBERT H. WARBURTON.

REFERENCES CITED

The following references are of record in the file of this patent:

UNITED STATES PATENTS

| Number | Name | Date |
| --- | --- | --- |
| 368,607 | Pearne | Aug. 23, 1887 |
| 514,452 | Basinghood | Feb. 13, 1894 |
| 1,099,464 | Olson | June 9, 1941 |